United States Patent [19]
Sharpe, Jr.

[11] Patent Number: 4,741,838
[45] Date of Patent: * May 3, 1988

[54] FLOCCULATION OF HIGH SOLIDS MINERAL SLURRIES

[76] Inventor: Andrew J. Sharpe, Jr., Star Rte. Box 130, Comfort, W. Va. 25049

[*] Notice: The portion of the term of this patent subsequent to Mar. 3, 2004 has been disclaimed.

[21] Appl. No.: 872,838

[22] Filed: Jun. 11, 1986

Related U.S. Application Data

[63] Continuation-in-part of Ser. No. 744,020, Jun. 12, 1985, Pat. No. 4,647,382.

[51] Int. Cl.⁴ ............................................. C02F 1/56
[52] U.S. Cl. .................... 210/710; 106/288 B; 209/5; 210/727; 210/734; 501/148
[58] Field of Search ............... 106/288 B; 209/5; 210/710, 725, 727, 728, 734, 778; 501/148

[56] References Cited

U.S. PATENT DOCUMENTS

| | | | |
|---|---|---|---|
| 3,539,003 | 11/1970 | Bidwell | 106/288 B |
| 3,617,573 | 11/1971 | Monagle | 210/734 |
| 3,692,673 | 9/1972 | Hoke | 210/728 |
| 3,737,333 | 6/1973 | Sawyer, Jr. | 106/288 B |
| 3,879,283 | 4/1975 | Mercade | 106/288 B |
| 4,077,930 | 3/1978 | Lim et al. | 210/734 |
| 4,186,027 | 1/1980 | Bell et al. | 106/288 B |
| 4,334,985 | 6/1982 | Turner, Jr. | 501/148 |
| 4,372,653 | 8/1982 | Halverson | 210/734 |
| 4,509,987 | 4/1985 | Farrar et al. | 241/16 |

Primary Examiner—Peter Hruskoci

[57] ABSTRACT

Aqueous mineral slurries containing 10% by weight or more of finely divided mineral solids are flocculated prior to dewatering and/or thickening to obtain improved throughput and/or to reduce moisture in the dewatered product, by treating the slurries with polymers comprising at least about 1% by weight 2-acrylamido-2-methyl propyl sulfonic acid copolymerized with acrylamide and/or other suitable water-soluble monomers. The polymers must have a Brookfield viscosity of at least 7000 cps at 7.5% concentration in water. Flocculation of the mineral slurries with these polymers also provides improved re-dispersibility of the dewatered mineral in the filter cake. During redispersion, additional dry mineral may be added to obtain a final solids content as high as 70% or more. The Brookfield viscosity of the final high solids slurry comprising a significant portion of filter cake treated with the flocculants of this invention is not detrimentally affected.

13 Claims, No Drawings

FLOCCULATION OF HIGH SOLIDS MINERAL SLURRIES

RELATED APPLICATION

This is a continuation-in-part of my previous application Ser. No. 744,020, filed June 12, 1985 now U.S. Pat. No. 4,647,382, having the same title.

TECHNICAL FIELD

This invention relates to an improved process for flocculating and thickening and/or dewatering aqueous pigment slurries containing 10% by weight or more of pigment, which provides improved dewatering and subsequently provides improved redispersion of the pigment after filtering it. More particularly, this invention relates to the use of an anionic copolymer flocculant comprising at least about 1% 2-acrylamido-2-methyl propyl sulfonic acid for treating finely divided minerals such as kaolin clay, calcium carbonate, calcium sulfate, and the like, to purify, filter, dewater, redisperse, and prepare them for shipment.

BACKGROUND OF THE INVENTION

Flocculants are reagents which are added to suspensions of solids to cause the solids to agglomerate (or floc) and settle or dewater more efficiently. A highly effective type of flocculant is the polymeric type which may be prepared in numerous variations. Polymeric water-soluble flocculants may be nonionic, anionic, cationic, or amphoteric. The particular type of flocculant to be used in a given application may depend upon the nature of the surface of the suspended solids and other factors such as pH.

Acrylamide monomer, a nonionic, is a basic building block for water soluble polymers because of its price and availability. It may be homopolymerized to obtain nonionic polymers. It is frequently copolymerized with one or more monomers containing primary, secondary, tertiary, or quaternary amine groups to obtain cationic flocculants. Similarly, it may be copolymerized with acrylic acid, 2-acrylamido-2-methyl propyl sulfonic acid and other monomers containing acid groups to obtain anionic flocculants.

Water soluble copolymers containing sulfonate groups are known in the art to be effective flocculants. U.S. Pat. No. 3,692,673 to Hoke teaches the use of polymers of 2-acrylamido-2-methyl propyl sulfonic acid and their salts as flocculants particularly for use in clarification of surface water and municipal sewage. While Hoke uses a low solids suspension of kaolin (200 ppm) to approximate surface water turbidity, the present invention is different in that Hoke works with a 200 ppm suspension of kaolin while the present invention is concerned with 10% or more mineral slurries (100,000 ppm or more). The aqueous mineral suspensions containing 10% or more solids treated in the present invention exhibit much higher viscosities of at least 100 cps or greater than the 200 ppm suspension of Hoke. Such high viscosities tend to inhibit thorough and even distribution of the flocculant among the mineral particles, said thorough and even distribution being necessary to achieve flocculation. Moreover, the objective of the work reported in Hoke is supernate clarity, i.e. improved solids removal and/or improved settling rate, whereas the present invention involves, for example thickening and/or dewatering. Thickening or dewatering, i.e. the creation of a compact filter cake containing as little water as possible, places different and more stringent requirements on a flocculant than the separation of solids from water without regard to the condition of the separated solids.

In U.S. Pat. No. 3,617,572 Monagle teaches the use of copolymers of acrylamide and an alkali metal salt of vinyl sulfonic acid as effective flocculants for improved settling of clays, including kaolin, which are present as impurities in concentrated salt solutions. Again, Monagle is concerned with improved solids capture, i.e. clarity or settling rate, which is distinct from the objective of the instant invention. It is recognized in the art that vinyl sulfonate polymerizes very, very sluggishly compared to acrylamide. As a result, copolymers of vinyl sulfonic acid and acrylamide are very likely block-like. Conversely, 2-acrylamido-2-methyl propyl sulfonic acid (AMPS) and its salts polymerize at a rate only slightly less than that of acrylamide; acrylamide/AMPS copolymers are approximately random copolymers. Due to the significant difference in intra-molecular structure, any performance results of VSA/AM copolymers would not anticipate or predict the results to be obtained with AMPS/AM copolymers.

Finally, in U.S. Pat. No. 4,372,653, Halverson teaches the use of copolymers of 99–65 mole percent acrylamide and 1–35 mole percent 2-acryl-amido-2-methyl propyl sulfonic acid and having Brookfield viscosities of at least 2.0 cps at 0.08% concentration in one normal NaCl as effective flocculants especially useful for treating phosphate slimes. Halverson also describes the use of AMPS/AM copolymers as flocculants for human wastes, and for processing streams encountered in the copper, uranium, potash and coal industries. It is noteworthy that despite the several flocculation applications described for other mining processes, Halverson does not consider dewatering, particularly of Kaolinitic clays. This is not surprising, since one skilled in the art would not normally consider the use of a flocculant where redispersion is essential as with the dewatering of Kaolinic clays. Halverson describes the use of AMPS/AM polyumers as coagulant aids, in conjunction with alum, for color removal. All the performance data reported by Halverson pertains to improved settling rate or reduction of the volume of the underflow.

The reader may also be interested in Engelhardt et al U.S. Pat. No. 4,357,245, which describes a drilling mud containing 2-acrylamido-2-methyl-propane-3-sulfonic acid copolymerized with acrylamide, and the prior art reviewed therein. See also Engelhardt et al U.S. Pat. No. 4,309,523, also describing a drilling mud, and Lim et al U.S. Pat. No. 4,077,930 and 4,147,681 which describe self-inverting emulsions of similar polymers. Polymers similar to the ones I employ have also been used by Adams et al in U.S. Pat. No. Re. 29,595, Randin in U.S. Pat. No. 4,296,016, and Doggett et al U.S. Pat. No. 4,136,078 for various purposes.

Despite these and many other teachings, no one has yet developed a flocculant which will effectively flocculate aqueous pigment slurries such as Kaolinitic clays for dewatering or thickening and subsequently permit effective redispersion of the thickened or dewatered slurry to obtain a high solids, e.g. 60–70% or more solids, low viscosity product. This is not too surprising when one considers that flocculation and dispersion of solids in a slurry are totally opposite phenomena. A flocculant causes the particles to agglomerate into larger clumps which settle or dewater more rapidly. A dispersant functions by causing the individual particles to repel—the opposite mechanism.

Approximately 5 to 6 million tons of kaolin clay per year are mined, processed and shipped from the Southeast United States. The clay is usually mined by the open pit method. It is then slurried in water at about 20–30% solids, dispersed with various combinations of inorganic and organic dispersants to maintain a low viscosity, and processed. Processing includes removal of iron and other magnetic impurities, removal of sand and silt, bleaching for whiteness and brightness, and, finally, dewatering, usually on rotary vacuum filters, to obtain a filter cake which is 50–60% solids. Part of the filter cake is spray dried, packaged and sold as solid dry clay. A portion of the filter cake is spray dried and blended back with the remaining filter cake to obtain a 70% solids aqueous slurry. Additional dispersants may be added to the 70% slurry as needed to obtain a final Brookfield viscosity of less than 1000 cps (preferably less than 500 cps). This low viscosity 70% slurry is then shipped in bulk to the customer.

While many high molecular weight organic polymers—cationic, anionic and nonionic—have been shown to be capable of flocculating kaolin clay in a satisfactory manner, non has been able to do so without having significant deleterious effects in the blending back or redispersing of the 70% slurry. The presence of the flocculant in the slurry normally will work against the desired effect of the dispersant, typically a low molecular weight polyacrylic acid, to disperse the solids and lower the viscosity. The necessary low viscosity for the final product has not been achieved to date.

DESCRIPTION OF THE INVENTION

The present invention employs certain polymeric flocculants for thickening or dewatering aqueous pigment, clay or mineral slurries containing 10% by weight of more pigment, clay or mineral (collectively mineral) wherein the flocculated mineral may be re-dispersed after the separation process by conventional means such as addition of up to about 5 lb./ton of solids of low molecular weight anionic polymer such as polyacrylic acid with mixing. The polymers of the instant invention provide either increased throughput or increased solids content in the product stream of the dewatering operation. Further, increased throughput is usually obtained with little or no detrimental effect on cake solids. Likewise increased cake solids are usually obtained with little or no detrimental effect on throughput. Frequently increased throughput and cake solids are obtained simultaneously. One skilled in the art will recognize that this result is very surprising and very unexpected. It is generally accepted in the art that a polymer which will improve filter throughput will normally cause a decrease in product stream (cake) solids. Conversely a polymer which will improve product stream solids may be expected to cause a decrease in throughput. Further, the polymers employed in the present invention flocculate the subject aqueous mineral slurries for thickening and/or dewatering through a mechanism as yet not understood, which permits the flocculated mineral slurry to be redispersed to a high solids, low viscosity aqueous slurry. This result is highly surprising and unexpected. My polymers will perform whether or not the mineral slurry is pretreated with an inorganic flocculant or filter aid such as alum, magnesium or calcium compounds. The flocculants of the present invention, polymers of 2-acrylamido-2methyl propyl sulfonic acid interact with the system in the subsequent redispersing operation to provide lower viscosity higher solids slurries than can be obtained using unflocculated slurry. In fact, the use of 0.2 lbs/ton of a 7.5% solution (0.015 lb/ton) of the polymers of the instant invention may permit reduction of the dispersant dosage during the redispersal operation by at least 1.0 lb/ton.

BEST MODE OF THE INVENTION

The instant invention employs flocculants which effectively enhance the dewatering operations during the processing of pigment slurries and which also permit outstanding solids concentrations and viscosities on re-dispersing. The process of the instant invention, in contrast to the use of flocculants described in the prior art, provides increased throughput with little or no detrimental effect on product solids and increased solids with little or no detrimental effect on throughput in the product stream of the dewatering operation and in many instances simultaneously provide increased throughput and solids. My invention includes outstanding re-dispersion of said pigments (pigments, clay and minerals are used interchangeably herein). My process has shown surprising utility in dewatering and re-dispersing Kaolin clay. These same advantages may be realized in processing other Kaolinitic clays, calcium carbonate, calcium sulfate (gypsum) and in other operations where finely ground solids must be dewatered and subsequently redispersed.

Dewatering devices which may be used include vacuum filters, pressure filters, centrifuges, thickeners, and the like.

The flocculants of the instant invention are anionic polymeric flocculants comprising from about 1 to 100 mole percent repeating units derived from 2-acrylamido-2-methyl propyl sulfonic acid and/or its neutralized salts and from 0 to 99 mole % of repeating units derived from acrylamide or other suitable monomer. More preferably the polymers contain from about 1 to 100 mole percent of 2-acrylamido-2-methyl propyl sulfonic acid and from 99 to 0 mole percent of acrylamide. The polymer may be include acrylic acid either by monomer addition in the original synthesis of the polymer or by hydrolysis from acrylamide, as is known in the art. Other compatible water-soluble or water-dispersable monomers, such as n-vinyl pyrrolidone, methacrylic acid, vinyl sulfonate, and maleic acid may also be employed in amounts which do not significantly reduce the performance of the overall polymer. The essential monomer, 2-acrylamido-2-methyl propyl sulfonic acid, has the formula

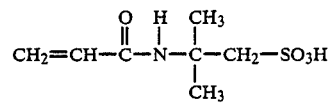

The hydrogen in the sulfonate group may be substituted with any common readily soluble cation such as potassium, sodium, lithium, or ammonium.

The anionic flocculants of the instant invention must have a Brookfield viscosity of at least 7000 cps when measured in a 7.5% aqueous solution of said polymers.

EXAMPLES

The following specific examples are intended to illustrate certain aspects of the present invention; they are not to be construed as limitations thereof. Standard laboratory filter leaf tests were completed to demonstrate the improved filter operation attainable by using very small quantities of the polymers of the instant invention. As is known in the art, the filter leaf test employs a hollow, more or less conical, plastic device which is connected to a vacuum pump or aspirator and which is covered with a piece of filter cloth, preferably the same type of cloth used commercially for the slurry being tested. The filter leaf (the conical device and the cloth) is then immersed in a container of slurry for a predetermined number of seconds approximating immersion on the commercial filter, and kept under a vacuum to draw the slurry to the cloth. The filter leaf is then inverted for another predetermined time (in the following examples the times were 25 and 120 seconds respectively) under vacuum to dry. The cake obtained on the cloth is then scraped into a container and weighed. The cake is dried overnight at a standard temperature, e.g. 105 degrees C., and reweighed. Yield of wet filter cake from the lab filter is determined as grams per square inch. This result is converted to pounds per square foot to predict performance on the full scale filter. Cake solids is calculated from the dry weight and wet weight of the collected filter cakes. The cakes from 4 filter leaf evaluations were combined to obtain each result listed below. In Table I, bowl and bowl plus clay weights are expressed in grams. The yield of pounds per square foot per hour is calculated from the lab filter yield which is in terms of grams per square inch, taking into account the known revolutions per hour and total square footage of filter area for the full-scale commercial filter. Determinations were completed for the control and each polymer dosage. The multiple determinations improve the statistical significance of the results considerably. A very fine (very small particle size, e.g. 97% <2 micron) grade of Kaolin clay which is extremely difficult to filter was used in these evaluations.

EXAMPLE 1

A high molecular weight, 100% -2-Acrylamido-2-methyl propyl sulfonic acid polymer (AJS-28) was used. The product was a water-in-oil emulsion polymer which had an intrinsic viscosity of greater than one in 0.5 normal NaCl solution and which contained approximately 30% by weight sodium 2-acrylamido-2-methyl propyl sulfonate polymer. Other conditions for these evaluations are summarized below.

| feed solids | 34.3 |
|---|---|
| feed temperature | 70 |
| feed pH | 3.5 |
| inches vacuum | 24 |
| CFM cloth | 3.5 |
| backing | closed knit |
| % submergence | 30 |
| filter rev/hr | 45 |

TABLE I

| Polymer dosage* | Bowl wt | Bowl + Wet | Bowl + Dry | Yield lb/sq | Yield ton/hr | Cake solids |
|---|---|---|---|---|---|---|
| 0 | 147.2 | 244.7 | 209.0 | 19.58 | 29.89 | 63.38 |
| 0.4 | 114.2 | 187.9 | 162.6 | 15.33 | 23.41 | 65.67 |

*Slurry samples were pretreated with 4.5 lbs./ton of sulfonic acid.

The results in Table I clearly show that the 2-acrylamido-2methyl propyl sulfonic acid polymers of the instant invention provide significant increases in cake solids at low dosages, even in the absence of pretreatment with alum.

EXAMPLE 2

A high molecular weight copolymer, (AJS-13) 90% by weight acrylamide/10% by weight 2-acrylamido-2methyl-propyl sulfonic acid which was 7.5% active and which had a Brookfield viscosity of 31,500 cps (spindle 6RV@ 20 rpm) was used in performing the following eveluations. Other conditions for these evaluations are summarized below.

| feed solids | 20.35 |
|---|---|
| feed temperature | 68 degrees F. |
| feed pH | 3.46 |
| inches vacuum | 25 |
| CFM cloth | 3.2 |
| cloth backing | close knit |
| seconds submergence | 25 |
| seconds drying | 120 |
| filter rev/hr | 24 |

TABLE II

| Polymer dosage | Bowl wt | Bowl + Wet Clay | Bowl + Dry Clay | Yield lb/sq ft/hr | Yield ton/hr | Cake solids (%) | Filtrate solids (%) | mls filtrate |
|---|---|---|---|---|---|---|---|---|
| 0 | 174.34 | 262.40 | 221.38 | 5.96 | 9.10 | 53.42 | 0.97 | 150 |
| (control) | 179.11 | 269.29 | 227.15 | 6.09 | 9.29 | 53.27 | 0.84 | 148 |
|  | 179.42 | 265.85 | 226.45 | 5.96 | 9.10 | 54.41 | 0.86 | 142 |
|  |  | mean |  | 6.00 | 9.10 | 53.70 | 0.89 |  |
| 0.2 lbs | 177.02 | 20.67 | 228.73 | 6.55 | 10.00 | 55.22 | 0.74 | 158 |
| — | 182.31 | 278.78 | 235.39 | 6.73 | 10.27 | 55.02 | 0.83 | 162 |
| ton | 183.81 | 279.18 | 236.28 | 6.65 | 10.15 | 55.02 | 0.80 | 160 |
|  |  | mean |  | 6.64 | 10.14 | 55.09 | 0.79 |  |
| 0.3 lbs | 178.12 | 274.37 | 231.51 | 6.76 | 10.33 | 55.47 | 0.95 | 166 |
| — | 173.93 | 272.09 | 228.09 | 6.86 | 10.48 | 55.18 | 0.89 | 168 |
| ton | 178.12 | 276.21 | 232.42 | 6.88 | 10.51 | 55.36 | 0.85 | 168 |
|  |  | mean |  | 6.84 | 10.44 | 55.33 | 0.90 |  |

All samples of clay slurry were treated with 4.5 lbs./ton of sulfuric acid and 2.0 lbs./ton of commercial liquid alum prior to the filter leaf evaluations which results are described in Table II.

The results of Table II clearly show that significant increases in filter throughput can be achieved with very small dosages of the polymers of the instant invention. Further, cake solids are also significantly improved. Even further, the dosages required to achieve these improvements are so small as to be considered miniscule: 0.2 pound per ton of 7.5% active product equals 0.015 pounds active pounds product per ton of clay produced and provides 10.7% increase in throughput and 2.6% increase in cake solids. 0.3 pounds per ton equals 0.0225 active pounds of product per ton of clay and provides a 14% increase in filter throughput and 3.0% increase in cake solids. Particularly significant is the fact that a flocculant which is this effective has no detrimental effect on re-dispersion of the filter cake to obtain a low viscosity slurry.

Persons skilled in the art will recognize that the above results presented in Table II represent a departure from the prior art teachings. One would normally predict a loss in filter cake solids or, at best, maintaining approximately the same cake solids when employing a flocculant to improve filter throughput. This is based on the accepted logic that in order to release water faster, the filter cake must be more porous. Conversely, teachings of the art to date would predict a loss in filter throughput in situations where a flocculant increased filter solids. This is based on the accepted principle that a more dense, more closely packed filter cake would release water more slowly. Thus, a simultaneous improvement in throughput and cake solids would not be predicted based on the prior art.

The same kaolin clay which was used in Table II was redispersed in the laboratory to simulate preparation for shipment. The weighed, dried filter cake from each experiment was added to sufficient water and dispersant to obtain approximately 70% clay solids. The level of dispersant ("60–40", a mixture of 60% soda ash and 40% a 43% solution of low molecular weight polyacrylic acid) is noted in Table III. The mixture was then placed on a Hobart lab mixer and mixed for 10 minutes. The Brookfield and Hercules viscosity of the redispersed slurry was then measured and recorded. Results of the redispersing procedure are given in Table II. In each measurement of Brookfield viscosity, the spindle 1RV was used and the speed was set at 20 revolutions per minute. For the Hercules measurement, the A bob and 1100 rpm was used in all cases. On both the Brookfield and Hercules scales, the desired lower viscosity is indicated by a lower value.

TABLE III

| Flocculant (AJS-13) | lb/ton 60–40 | pH | % Solids | Brookfield Cps | % Solids | Hercules dynes |
|---|---|---|---|---|---|---|
| Control (no floc.) | 4.5 | 6.40 | 70.30 | 490.0 | | |
| | 5.5 | 6.90 | 70.30 | 455.0 | 70.5 | 2.6 |
| 0.2 lbs/ ton | 4.5 | 6.39 | 70.35 | 435.0 | | |
| | 5.5 | 7.01 | 70.35 | 397.5 | 70.5 | 2.6 |
| 0.3 lbs/ ton | 4.5 | 6.13 | 70.50 | 345.0 | | |
| | 5.5 | 6.14 | 70.50 | 372.5 | | |
| | 6.5 | 6.85 | 70.50 | 331.3 | 70.5 | 2.1 |
| 0.4 lbs/ ton | 4.5 | 5.96 | 70.60 | 372.5 | | |
| | 5.5 | 6.83 | 70.60 | 347.5 | 70.6 | 2.0 |
| 0.5 lbs/ ton | 4.5 | 6.04 | 70.49 | 375.0 | | |
| | 5.5 | 6.81 | 70.49 | 358.8 | 70.5 | 2.2 |

The results reported in Table III clearly demonstrate that the use of the flocculants of the invention do not have a detrimental effect on redispersal of the filter cake to obtain a high solids (i.e. 70%) slurry which exhibits low viscosity; by contrast, the prior art would predict that any flocculant which effectively flocculates the clay (mineral) to effect significant improvements in the dewatering operation would interfere with redispersal to such an extent that either (a) a 70% solids slurry could not be obtained or (b) the resulting 70% solids slurry exhibited a viscosity so high as to not be handleable with available pumps and allied equipment.

Further, the results reported in Table III also clearly demonstrate that the use of 0.2-0.3 lbs/ton (0.015-0.0225 active lbs/ton) or more of the flocculants of the instant invention will permit one to obtain the same or lower slurry viscosity while reducing the dosage of the conventional dispersant by at least 1.0 lb/ton, a reduction of about 20%.

I claim:

1. Method of preparing a high solids slurry from a slurry containing at least 10% or more finely divided mineral solids comprising (a) adding thereto an effective amount of an anionic polymeric flocculant comprising 1-100 mole percent of repeating units derived from 2-acrylamido-2-methyl propyl sulfonic acid or a water-soluble salt thereof, wherein said polymeric flocculant has a Brookfield viscosity of at least 7000 cps in 7.5% aqueous solution, to flocculate said solids, (b) dewatering said slurry to obtain a dewatered product, and (c) dispersing the said dewatered product to obtain a final slurry having a Brookfield viscosity of less than 1000 cps and a solids content of at least 50%.

2. Method of claim 1 wherein about 0.01 pound to about 0.25 pound of anionic polymeric flocculant comprising 75-99 mole percent repeating units of acrylamide and 1-25 mole percent repeating units of 2-acrylamido-2-methyl propyl sulfonic acid, and up to about ten mole percent copolymerizable monoethylenically unsaturated monomer is added to the slurry per ton of solids therein.

3. Method of claim 1 wherein the mineral solids are kaolin clay.

4. Method of preparing a high solids kaolin clay slurry from a slurry of about 10% or more Kaolin comprising adding thereto an effective amount of an anionic polymeric flocculant comprising 0-99 mole percent acrylamide and about 1-100 mole percent 2-acrylamido-2-methyl propyl sulfonic acid or a water soluble salt thereof, wherein said polymeric flocculant has a Brookfield viscosity of at least 7000 cps in 7.5% aqueous solution, to flocculate said solids, dewatering said slurry to obtain a dewatered product, and dispersing said dewatered product to obtain a slurry having a Brookfield viscosity of less than 1000 cps and a solids content of at least 50%.

5. Method of claim 4 wherein about 0.01 pound to about 0.25 pound of anionic polymeric flocculant comprising about 75-99 mole percent repeating units of acrylamide, about 1-25 mole percent repeating units of 2-acrylamido-2-methyl propyl sulfonic acid, and up to about ten mole percent of copolymerizable monoethylenically unsaturated monomer is added to the slurry per ton of solids therein.

6. Method of claim 4 wherein an effective amount of dispersing agent is added to the filter cake in the redispersing step.

7. Method of claim 4 wherein additional kaolin clay is added to the filter cake to increase the solids content of the slurry.

8. Method of dewatering and re-dispersing a mineral slurry containing at least 10% finely divided mineral solids, comprising adding thereto, prior to dewatering, an effective amount of an anionic polymeric flocculant comprising about 1-100 mole percent of 2-acrylamido-2-methyl propyl sulfonic acid or a water soluble salt thereof and wherein said polymeric flocculant has a Brookfield viscosity of at least 7000 cps in 7.5% solution to flocculate said solids, dewatering said solids in a dewatering device to produce a dewatered product, and adding to said dewatered product an effective amount of a low molecular weight polyacrylic acid dispersant to form a slurry having a Brookfield viscosity of less than 1000 cps and a solids content of at least 50%.

9. Method of claim 8 wherein about 0.01 pound to about 2.0 pounds of polymeric flocculant per ton of solids therein are added to the slurry.

10. Method of claim 8 wherein the mineral solids are Kaolinitic clay.

11. Method of claim 8 including the step of adding dried mineral solids to the redispersed slurry to increase the solids content.

12. Method of claim 8 including the step of pretreating the slurry with a multivalent inorganic cation.

13. Method of claim 8 wherein the dewatering device is a filter.

* * * * *